United States Patent
Bar-Zeev et al.

(10) Patent No.: US 9,563,326 B2
(45) Date of Patent: Feb. 7, 2017

(54) SITUATION-AWARE PRESENTATION OF INFORMATION

(71) Applicant: Microsoft Corporation, Redmond, WA (US)

(72) Inventors: Avi Bar-Zeev, Redmond, WA (US); Gonzalo A. Ramos, Kirkland, WA (US); Michael Chowning Byron, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/654,488

(22) Filed: Oct. 18, 2012

(65) Prior Publication Data

US 2014/0114988 A1 Apr. 24, 2014

(51) Int. Cl.
  *G06F 7/00* (2006.01)
  *G06F 17/30* (2006.01)
  *G06F 3/0481* (2013.01)
  *G06F 17/00* (2006.01)

(52) U.S. Cl.
  CPC ....... *G06F 3/0481* (2013.01); *G06F 17/30112* (2013.01); *G06F 17/30126* (2013.01)

(58) Field of Classification Search
  CPC ............... G06F 17/30112; G06F 17/30126; G06F 3/4081
  USPC .......................................... 707/724
  See application file for complete search history.

(56) References Cited

U.S. PATENT DOCUMENTS

| | | | |
|---|---|---|---|
| 6,243,091 B1* | 6/2001 | Berstis | 715/839 |
| 7,376,510 B1* | 5/2008 | Green | 701/436 |
| 7,633,383 B2 | 12/2009 | Dunsmoir et al. | |
| 7,778,758 B2* | 8/2010 | Tsuchiya et al. | 701/93 |
| 8,099,237 B2 | 1/2012 | Mays et al. | |
| 8,117,197 B1* | 2/2012 | Cramer | 707/731 |
| 2002/0087522 A1* | 7/2002 | MacGregor et al. | 707/3 |
| 2002/0147717 A1* | 10/2002 | Barros et al. | 707/7 |
| 2006/0155751 A1 | 7/2006 | Geshwind et al. | |
| 2008/0183695 A1* | 7/2008 | Jadhav | G06F 17/30601 |

(Continued)

OTHER PUBLICATIONS

Lazaridis, et al., "Dynamic Queries over Mobile Objects", Retrieved at <<http://ftp.cse.buffalo.edu/users/azhang/disc/springer/0558/papers/2287/22870269.pdf>>, Proceedings of EDBT '02, Mar. 25-27, 2002, pp. 269-286.

(Continued)

*Primary Examiner* — Kannan Shanmugasundaram
(74) *Attorney, Agent, or Firm* — Steven Spellman; Tom Wong; Micky Minhas (57) ABSTRACT

Information may be presented to a user in a way that reflects an awareness of the user's current situation. The relationship between user's situation, and various people and things, may be analyzed to determine the user's proximity to those people and things. (Proximity may refer not only to geographic proximity, but also temporal proximity, relevance proximity, etc.) A user interface may show people and things at different levels of proximity to the user's current situation, with the level of proximity being represented visually. The user may reposition the center of focus to one of the people or things depicted. When the center is repositioned, the level of proximity of people and things may be shown relative to the new center of focus, filtered based on existing relationships of those people and things to the user.

20 Claims, 6 Drawing Sheets

(56) References Cited

U.S. PATENT DOCUMENTS

| | | | |
|---|---|---|---|
| 2008/0184149 A1 | 7/2008 | Cohen et al. | |
| 2009/0191898 A1 | 7/2009 | Lewis et al. | |
| 2010/0058196 A1* | 3/2010 | Krishnan | G06Q 10/10 715/747 |
| 2010/0250384 A1* | 9/2010 | Bhargava | 705/26 |
| 2010/0274753 A1 | 10/2010 | Liberty et al. | |
| 2011/0163874 A1* | 7/2011 | van Os | 340/539.13 |
| 2012/0054302 A1 | 3/2012 | Priyadarshan et al. | |
| 2012/0166433 A1 | 6/2012 | Tseng | |

OTHER PUBLICATIONS

Draper, et al., "A Visual Query Language for Correlation Discovery and Management", Retrieved at <<http://citeseerx.ist.psu.edu/viewdoc/download?doi=10.1.1.140.1779&rep=rep1&type=pdf>>, Proceedings of VAIL '08, Jul. 21-22, 2008, pp. 14-23.

"Corporation wiki" for Jeffrey Immelt, retrieved at << http://www.corporationwiki.comi/Connecticut/Fairfield/jeffrey-r-immelt-P6040019.aspx >>, retrieved on Oct. 9, 2012, 1 page.

International Search Report & Written Opinion for PCT Patent Application No. PCT/US2013/065714, Mailed Date: Jun. 30, 2014, Filed Date: Oct. 18, 2013, 10 Pages.

\* cited by examiner

SITUATION-AWARE PRESENTATION OF INFORMATION

BACKGROUND

Applications exist to help users find information. There are traditional search applications that are used to find documents that match a query. There are also map applications or geographic search applications that find places or information by combining text queries with geographic criteria. Many other types of applications include a search component—e.g., a calendar application that allows users to search for specific appointments or tasks based on a text query and/or temporal criteria.

These types of applications search for information in what amounts to a one-level analysis. That is, they search for information by evaluating the direct relationship between the search criteria and items of information. They do not perform a deeper relationship analysis on the information, and way in which the results are presented does not reflect a deeper analysis.

SUMMARY

Information may be shown to a user in a way that reflects awareness of the user's situation. In one example, situational awareness refers to an understanding of those things or events that are proximate to the user in the sense of being physically nearby (geographic proximity), occurring close in time (temporal proximity), or being of particular interest (relevance proximity).

The notion of what is proximate may take into account more than one degree of distance between a user and a given thing or event: e.g., a thing might be considered proximate to the user because an event in which the user will participate will occur in one minute (high temporal proximate to the user), and the thing is highly relevant to the event (high relevance proximity to an event that has a high temporal proximity to the user). Things and events may be thought of as being connected to each other in a graph by various types of proximity relationships. Things and events that are more than one edge away from the user in the graph may be shown to the user. For example, the user may be shown a meeting that is scheduled to start in five minutes (because the meeting has temporal proximity to the user), and may also be shown a list of participants in the meeting (because the participants have relevance proximity to the meeting).

In one example, a user's device may show the user a view of events and things that are relevant to the user. For example, on the home screen or lock screen of the user's device, a user interface may show the things and events of highest relevance to the user near the bottom of the screen, and may show things of more distant relevance higher up the screen. In one example, the interface may be divided into levels, with things and events that are one edge away from the user being shown on the first level, and things that are n edges away being shown n levels up the screen.

The interface may be interactive in the sense that the user may reposition the center of interest by indicating a thing or event shown on the interface. For example, if one of the events on the interface is a meeting that will take place in five hours, the user might tap (or otherwise indicate) that meeting, thereby indicating that the user would like to see things and events that are very proximate to that meeting (rather than things or events that are very proximate to the user's current situation). The device may then update the view accordingly.

When the center of interest is repositioned, the items that are shown to the user may be filtered based on their relationship to the user and the user's current situation. For example, if there is a restaurant that is three graph edges away from the user's current situation and the user chooses to reposition the center on that restaurant, the information that is then shown near the new center may be based on a combination of what is proximate to the restaurant and what is proximate to the user. In this way, the user may see a view from a chosen place in the information graph, with information filtered based on relevance to that particular user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Users of personal computers, smart phones, tablets, and other devices have various ways to get information. Search engines are effective at finding text documents, images, videos, etc., based on text, image, or audio queries. Map applications can find information based on geographic queries, and shopping search engines can find information based on various product and price criteria. User's also have calendar programs that can be used to organize events and appointments, contact programs that can be used to organize contact lists, social networks that organize and impose structure on social relationships.

The above-mentioned mechanisms are generally effective at helping the user to identify certain types of information. For example, if a user asks to see his calendar, the calendar program can show the user a set of appointments in an order, with the soonest appointment being shown first, the next soonest being shown second, and so on. If a user uses a map application or geographic search engine to find an "Asian restaurant," the search engine will generally provide a list of restaurants, ordered based on both relevance to the user's query and proximity to the user's current location.

However, what is shown to the user is generally a view based on a one-level analysis of what pieces of information relate to the user's request. If the user asks to see his calendar, he is shown upcoming appointments in time order. If the user asks for a restaurant, he may be shown a list of restaurants in an order that is based on distance from the user's current location. There may be more complex, multi-level relationships between the user and items that may be interest to the user.

The subject matter described herein provides a way to show a user information in a way that reflects and awareness of the user's current situation, and that also reflects complex existing relationships between things and events. The user's relationship to things and events may be viewed as a graph, in which any type of relationship (time, geography, relevance, pre-existing personal relationship, etc.) may be considered an edge on the graph. Edges in the graph may be weighted—e.g., an item that is very geographically close may have an edge with a high geographic weight, and an item that is coming up very soon may have a high temporal weight. Items that are connected by high value edges may be considered to be "proximate" to each other. (Although the word "proximate" often has spatial connotations, it will be understood that, as used herein, a relationship between two items may be considered proximate based on any type of strength of that relationship, regardless of whether the items are spatially close to each other.)

The user's current situation may be defined by the current time, the user's current location, the user's current set of relationships and interests, or any other type of information. (In order to protect the user's interest in privacy, information about the user may be obtained pursuant to appropriate permission obtained from the user.) An interface may be shown to the user that visually shows the different levels of proximity that items may have to the user's current situation. For example, appointments that are very close in time may be considered highly proximate to the user and thus may be shown on a first level in the user interface. Also, restaurants that are very close to the user geographically, and that serve a cuisine in which the user has previously expressed interest, may be considered highly "proximate" to the user and thus may be shown on a first level. Items that are more "distant" from (i.e., less "proximate" to) to the user may be shown on higher levels. For example, the user might have some distant acquaintances or business associates who are attending an upcoming meeting. If the upcoming meeting is shown on the first level, then the identities of the attendees may be shown on the second level, indicating that there is an existing relationship between the user and those people, but that relationship is perceived as being more distant than the relationship between the user and the imminent meeting that they are all to attend. It will be appreciated from this example that items to be shown to the user, and for which proximity can be ranked, may be "type mismatched". E.g., even though a meeting a person, and a restaurant are different types of things, it is possible to say whether the meeting, the person, or the restaurant is more proximate to the user and/or the user's current situation.

The interface on which information is presented may be interactive in the sense that the user can browse items on different levels, and can reposition the center of focus. With regard to browsing items, the user may be able to look at different items on a level, e.g., by swiping horizontally across that level on a touch screen to see all items on that level. With regard to repositioning the center of focus, the user may be able to tap on an item in order to provide an indication that the user would like to see other items that are proximate to the selected item and that relate to the user. For example, if the user sees a restaurant that is three levels up from the user's current position, the user might tap on the restaurant indicate that the user would like to see items that relate to the restaurant and to the user. Thus, the user might see a set of his friends who have also expressed interest in that restaurant or in the cuisine of that restaurant, or might see coupons for that restaurant if the user has expressed interest in receiving coupons.

Figure 1:
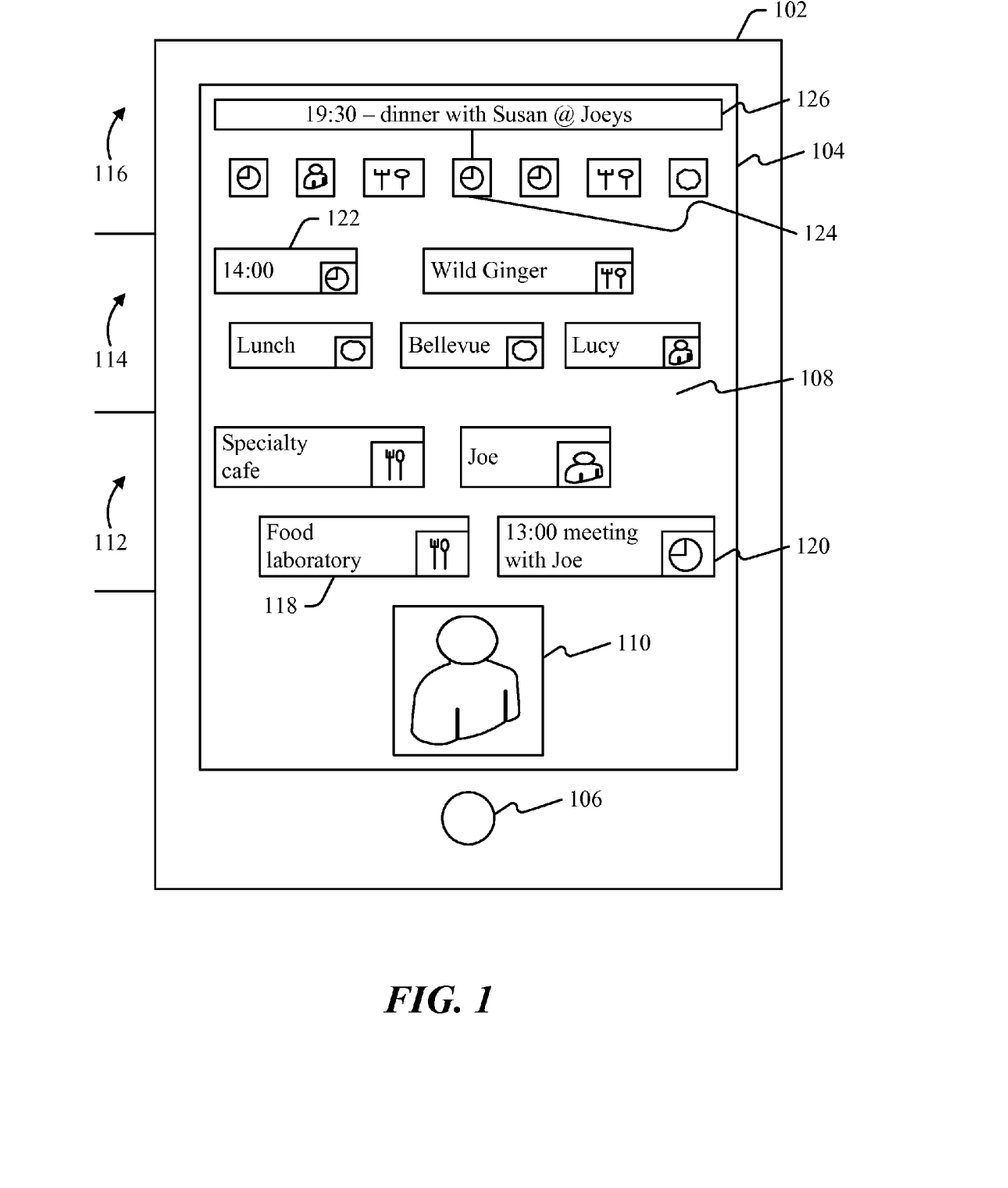
FIG. 1 is a block diagram of an example device with an example user interface.

Turning now to the drawings, FIG. 1 shows an example device, with an example user interface that shows a situationally-aware view of information. Device 102 may be any type of device that has computing capability—e.g., a smart phone, a personal computer, a set top box, a tablet computer, etc. In the example shown in FIG. 1, device 102 is depicted as a smart phone, but this depiction is merely an example; device 102 could be any appropriate type of device.

Device 102 may have a touch screen 104, which device uses both to communicate information to a user and also to receive information from the user. The physical interface of device 102 may include various other components, such as escape, or "home" button 106, as well as a microphone, a speaker, or any other type of components that allow communication between device 102 and its user.

On touch screen 104, an interface 108, comprising various types of information, is shown. At the bottom of touch screen 104 is shown a representation of user 110. In the example shown, the bottom of the screen represents the user's current "situation". That "situation" may comprise the current time, the user's current location, any status the user has previously indicated (e.g., "at work", "on vacation", etc.). (To protect the user's interest in privacy, information about the user may be used in accordance with appropriate permission obtained from that user.)

Interface 108 shows information relating to user 110 at various levels. In the example of FIG. 1, three levels 112, 114, and 116 are shown, although any number of levels could be used. Levels 112-116 represents a quantitative assessment of how "proximate" the various pieces of information are to the user and his or her current situation. Level 112 represents the information having the highest proximity to user 110's current situation, and levels 114 and 116 represents decreasing levels of proximity. In this example, successively lower levels of proximity are represented by successively higher positions on the screen. In the example of FIG. 1, levels 112-116 are shown as discrete horizontal bands across regions of touch screen 104, where each band corresponds to a given level, although levels 112-116 could have any appropriate visual representation.

In one example, the different levels are distinguished visually based on the size, and/or level of detail, of the icons or graphics that represent the information. Levels more proximate to user 110's current situation may have information represented by larger graphics and may include more detail, while levels less proximate to user 110's current situation may have information represented by smaller graphics, and/or may include less detail. As can be seen, each piece of information in level 112 is represented by a large box, containing text describing the information, and a graphic indicating the type of information. For example, item 118 is a restaurant called the "Food Laboratory", and it contains a fork-and-knife icon that identifies the item as a restaurant. Item 120 is an appointment, and it is represented by a box that contains a clock icon indicating that the item is an appointment, and text mentioning the time and topic of the appointment. (Other example icons used in FIG. 1 include a person's head and shoulders to represent a person, and a cloud to represent a concept, such as "lunch".) At level 114, boxes represent the various pieces of information, but the boxes are smaller, and the text in those boxes may contain less detail than in the larger boxes of FIG. 114. (E.g., an appointment item 122 shown at level 114 may contain the clock icon and the time, but not a description of the appointment.) At level 116, the boxes that are shown may be even smaller, and may have even less detail. For example, item 124 at level 116 contains only a clock icon indicating a restaurant, but does not show the name of the restaurant. (Details such as the name of the restaurant, its address, etc., might be viewable by explicit user request—e.g., by hovering on or tapping the item. For example, FIG. 1 shows expanded details 126 of item 124, which indicate the time and nature of the appointment. However, in the example shown, the initial view of interface 108 shows items at level 116 in a small view with few details.)

Using different sizes and/or different levels of detail to show items at different levels is a way of visually communicating the relative significance of the items at the different levels. Thus, large items at level 112, are items that are more proximate to user 110's situation, and thus may be of greater significance to user 110. Conversely, small items at level 116 may be less proximate to user 110's situation, and thus may be of less significance to user 110.

It is noted that the particular selection of items to show in interface 108, and which levels to put those items, may be determined in any manner. As discussed below in connection with FIG. 5, there may be an implicit or explicit graph of relationships between user 110 and various people and things. The items that are selected to be shown in interface 108, and the levels of those items, may be determined from an analysis of that graph. However, for the purpose of FIG. 1, it will be assumed merely that there is some way of assessing and ranking the proximity (geographic, temporal, or otherwise) that particular people and things have to user 110's current situation.

Figure 2:
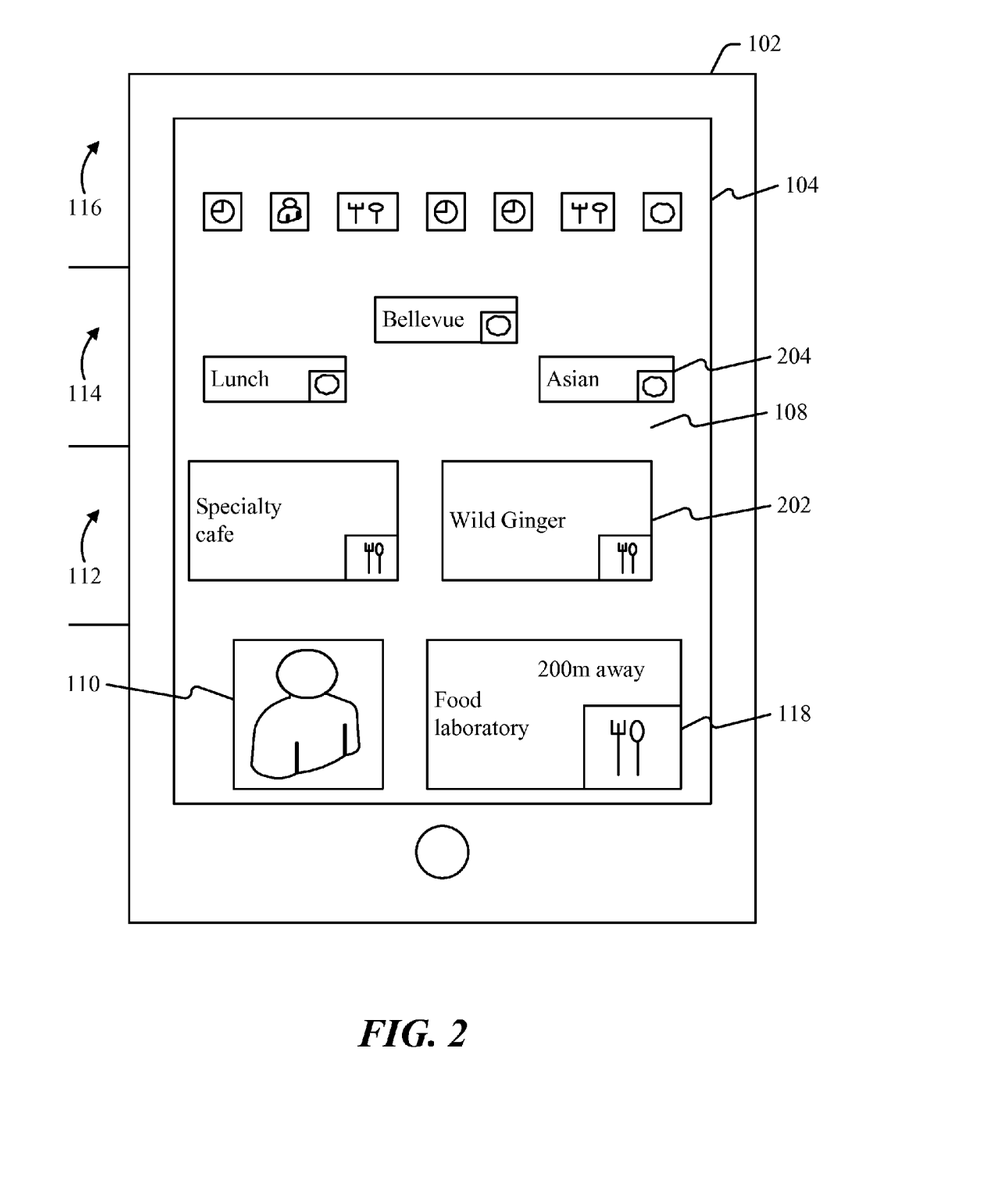
FIG. 2 is a block diagram of the example user interface of FIG. 1, with an altered center of focus.

FIG. 1 shows an initial view that may be shown to a user. That view may be constructed based on the assessed proximity of various people and things to the user. However, the user may choose to reposition the center of focus, in order to view items in his or her "world" from a different perspective. FIG. 2 shows an example in which the user has altered the center of focus.

FIG. 2 once again shows device 102, with interface 108 being shown on touch screen 104. In this example, the user has tapped, clicked, or otherwise indicated one of the items that was shown in FIG. 1, in order to indicate that the user wants to focus on that item. In this example, the user has indicated item 118, which is the "Food Laboratory" restaurant. Thus, a graphic for the Food Laboratory item 118 is put toward the bottom of the screen, thereby indicating that the food laboratory is now the center of focus for the information to be shown. As can be seen in FIG. 2, the food laboratory is 200 meters from the user's current location; with the food laboratory being the center of focus, it is now represented by a larger box than was used in FIG. 1, so additional details (such as its distance from user 110) can now be shown.

As can also be seen in FIG. 2, a graphic representing user 110 is also shown at the bottom of the screen next to the Food Laboratory restaurant, thereby indicating that the user himself (or herself) is still relevant in determining what information will be shown. That is, while the Food Laboratory is now the center of focus for the information that is being shown, the information that is selected to be shown may still be filtered based on its relevance to the user. For example, the Food Laboratory may have a very close relationship with ABC Restaurant Supply Company, and may also have appointments (e.g., dinner reservations) involving hundreds of people. However, the ABC Restaurant Supply Company, and the various diners who have made reservations at the Food Laboratory, might have no particular relationship with user 110, so those items are not shown in interface 108. Thus, user 110's existing relationships with people and things remain as a filter for what will be shown on interface 108, even when the view has been re-centered on the Food Laboratory.

In FIG. 2, the information that is shown is still organized into levels 112, 114, and 116. However, the level in which certain items appear has changed relative to those items' positions in FIG. 1. In particular, the restaurant Wild Ginger (item 202) has moved from level 114 to level 112. This move reflects the fact that Wild Ginger may have a high proximity to the Food Laboratory (where "proximity" is used in the broader sense discussed above, rather than merely geographic proximity). Similarly, the concept of "Asian" (item 204) may have a higher proximity to the Food Laboratory than to user 110. "Asian" may be a concept that was represented by one of the boxes in level 116 in FIG. 1 (prior to the user's having indicated Food Laboratory as the center of focus), but—with Food Laboratory now being the center of focus—"Asian" may be "upgraded" to a level 114 proximity. Other information that relates to the Food Laboratory might also be shown—e.g., one of the items that is "proximate" to the Food Laboratory might be a commercial offer relating to the Food Laboratory, such as a coupon.

In addition to the scenario depicted in FIG. 2—where Food Laboratory is identified as the center of focus—various other scenarios are possible. For example, a user might choose a specific meeting as the center of focus. The set of items shown to the user may then highlight items that are proximate to that meeting—e.g., concepts related to the topic of the meeting, people who will be in attendance at the meeting, restaurants near the meeting. As with the earlier example, user 110 may still serve as a filter for what information is shown. For example, there might be ten people attending the meeting in question, but the people who would be shown on interface 108 would be that subset of the attendees who have an existing connection to user 110. Or, there might be several concepts associated with the topic of the meeting, but the ones that appear on interface 108 might include only that subset of the several concepts in which the user has previously indicated an interest.

Figure 3:
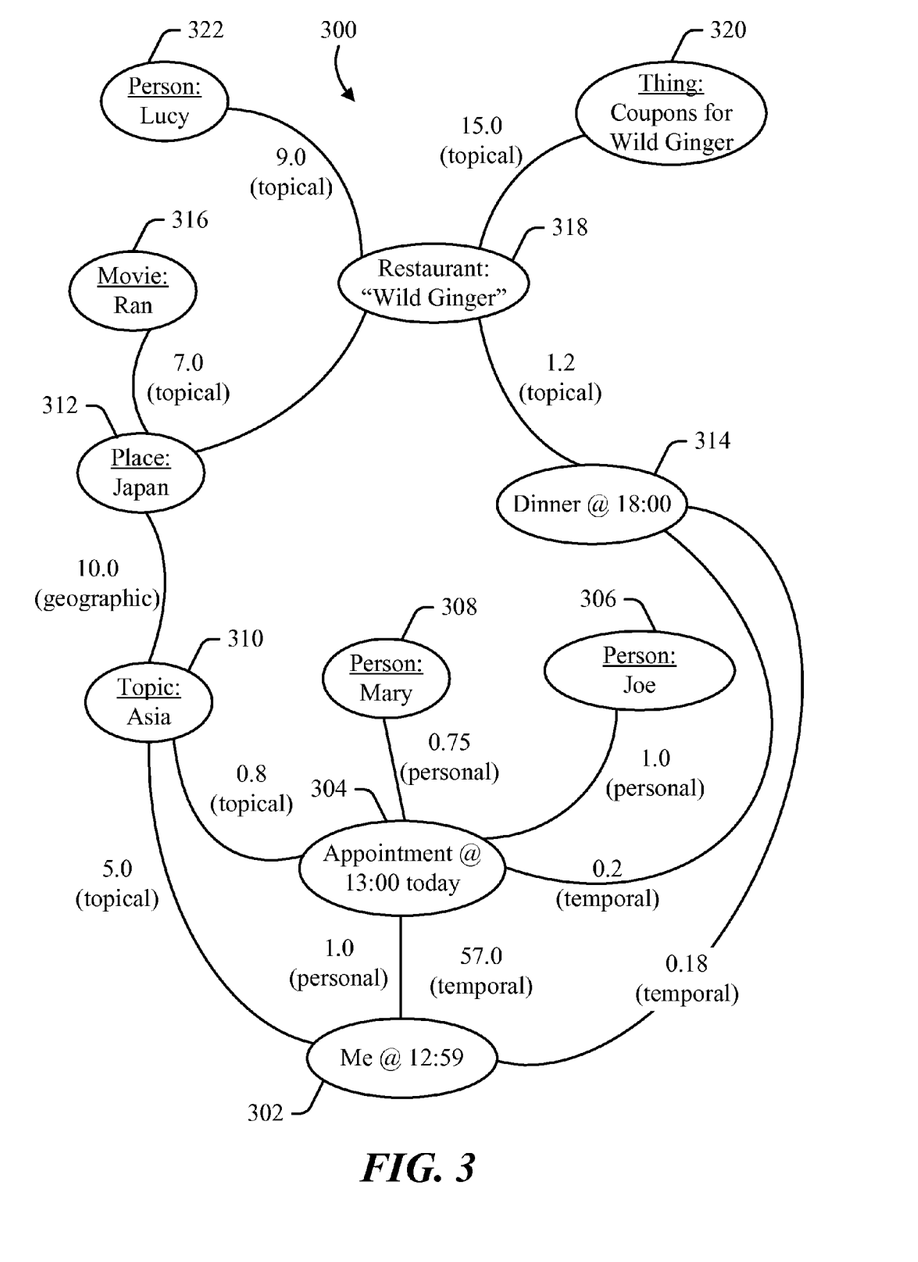
FIG. 3 is a block diagram of a graph showing example relationships between a user's current situation and various items of information.

As noted above, the interface 108 that is shown in FIGS. 1 and 2 contains a representation of people or things that relate to the user's current situation. As also noted above, the assessment of what people and things are proximate to the user's current situation may be made based on a graph showing the relationship between the user's current situation and various people and things. FIG. 3 shows an example of such a graph 300.

In the graph of FIG. 3, the user and his current situation are represented by node 302, identified as "Me @12:59". "12:59" indicates that the local time for the user is 12:59 on a 24-hour clock. The local time is part of the user's current situation. There may be other aspects to the user's current situation—e.g., a current physical location (which may be obtained from the user's device pursuant to appropriate permission obtained from the user), a status (e.g., "busy", "offline", "at work", "on vacation", etc.), or any other information that relates to the user's current situation.

Graph 300 also contains nodes 304, 306, 308, 310, 312, 314, 316, 318, 320, and 322, each of which represents a person or thing. "Thing", in this example, may include not only physical things (e.g., restaurants or places), but also topics or concepts (e.g., foreign affairs, archery, etc.). One reason that such topics or concepts may be included in the graph is that the user may have expressed interest in those concepts. In another example, topics may be connected to entities for reasons other than an explicit expression of user interest—e.g., a restaurant may be listed under "Thai Restaurant" in the telephone directory (thereby connecting the restaurant with the concept of Thai food), or may be in the one-dollar-sign category on a restaurant review site (thereby connecting the restaurant with the concept "inexpensive restaurants"). Thus, if the user has an existing connection with the restaurant, then the user may also have an (indirect) proximity relationship with the concepts of "Thai food" and "inexpensive restaurants".

Labeled edges connect pairs of nodes in graph 300, indicating a relationship between those nodes. The labels on the edges may have the following separate aspects: a type of relationship (e.g., temporal, topical, personal, geographic), and a numerical weight or strength of that relationship. For example, Node 304 represents an appointment at 13:00 that involves the user. Since the user's current situation includes the time 12:59, the appointment is scheduled to occur one minute later than the current time. Therefore, the appointment has a high "temporal" relationship to the user's current situation, so the edge between node 302 (the user's current situation) and node 304 (the appointment) has an attribute of "temporal" and a strength of 57.0. (The numerical values can be on any arbitrary scale; in this example, 57.0 is considered to be a relatively high weight to be assigned to an edge.) Since Joe is one of the attendees of the appointment, there is an edge between Joe's node (node 306) and the appointment node (node 304). An example attribute indicating this type of relationship is "personal", indicating that Joe is a person associated with that meeting. (The same attribute might be used to indicate the relationship between two people who are friends or acquaintances.) The strength of this relationship has a value of 1.0. There is also an edge between the appointment ad Mary (node 308). The strength of the relationship between the appointment and Mary is 0.75; the fact that the strength is less than the strength of Joe's relationship to the appointment might be due, for example, to Joe's being an obligatory attendee of the meeting and Mary's being an optional attendee. The user himself ("me") is also an attendee of the meeting represented by node 304. Thus, in addition to the strong temporal relationship between the user and the meeting discussed above, the edge between the user (node 302) and the meeting (node 304) has a second label, indicating a personal relationship of strength 1.0.

An analysis may be performed on graph 300 to determine the "proximity" of the user to the various people and things represented by nodes in the graph. This analysis may be performed in any manner. For example, the strengths of the existing relationships may be taken into account, so a personal relationship of 2.0 indicates a higher proximity than a personal relationship of 1.0. In another example, different types of relationships may be weighted differently—e.g., given two relationships of strength 1.0, a personal relationship of strength 1.0 might indicates a higher proximity than a temporal or geographic relationship of the same strength. Additionally, the number of edges that have to be traversed to establish a relationship might be taken into account—e.g., a thing than be connected to the user via one edge of strength 100.0 might be considered more proximate to the user than a thing that can only be connected by traversal of two edges of strength 100.0. Any type of analysis may be performed to arrive at proximity conclusions.

It is noted that graph 300 may change frequently. Graph 300 represents the user's current situation to various people and things, and aspects of the user's situation (e.g., current time, current location, etc.) may change rapidly.

Figure 4:
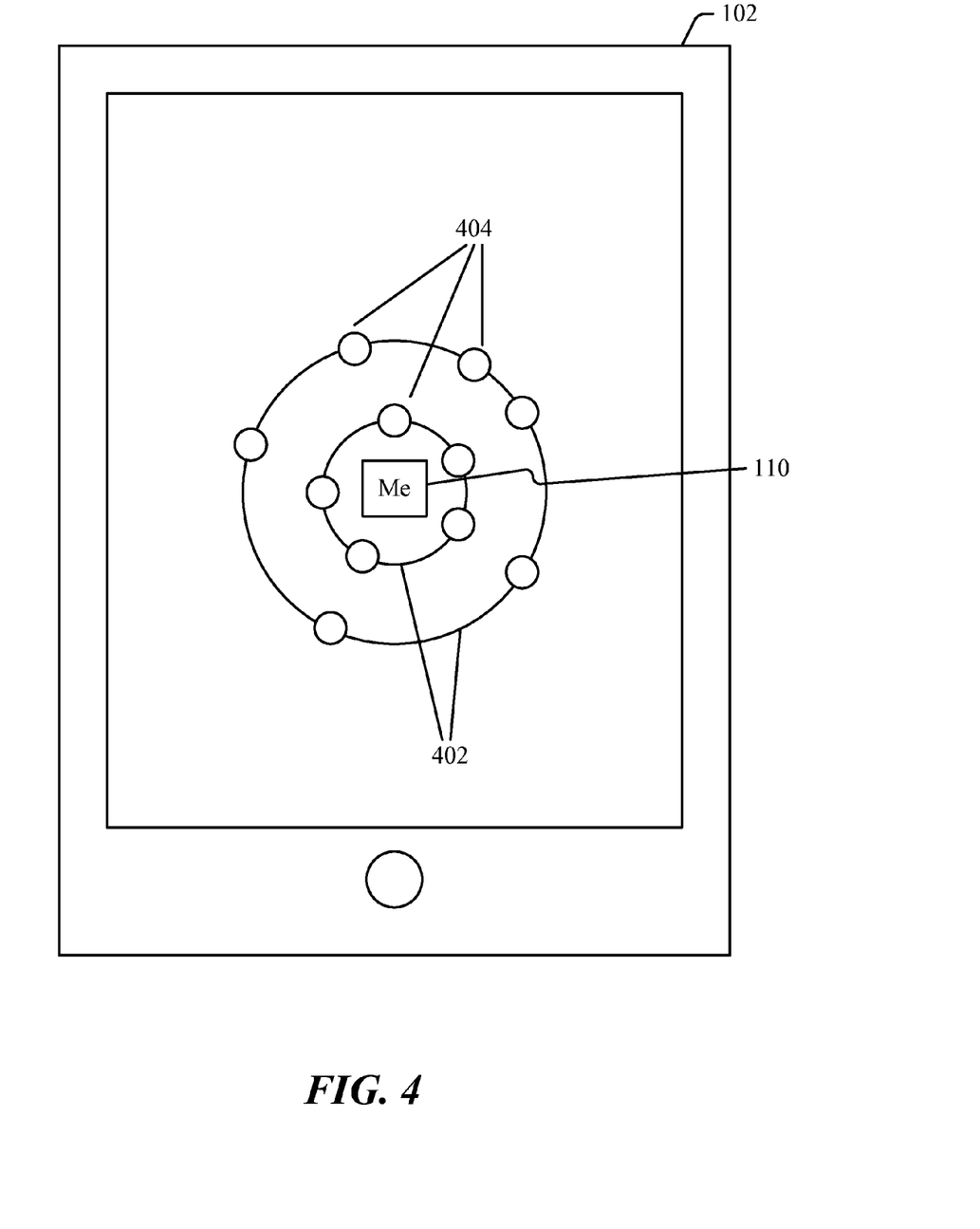
FIG. 4 is a block diagram of an alternative user interface showing relationships between a user's current situation and items of information.

The interface design shown in FIGS. 1 and 2 is merely one example way to show the people and things that relates to a user's current situation. FIG. 4 shows another example design of such an interface. In this example, the interface that is shown on device 102 has user 110 at the center of concentric circles 402. The concentric circles are populated with items of information (e.g., people, events, restaurants, etc.). Such items are depicted as small circles 404 that lie on the concentric circles. The particular circle on which an item appears represents that item's level of proximity to the user. For example, items that appear in the innermost concentric circle may have been determined to have high value relationships to the user's current situation on the graph of FIG. 3. Items on the next concentric circle may have been determined to have relationships that are less strong than those on the innermost concentric circle.

It is noted that the interfaces depicted in FIGS. 1, 2, and 4 are merely examples. Any appropriate design could be used to convey, visually, the proximity of people and things to the user's current situation. Any such designs are within the scope of the subject matter herein. For example, a variation on the techniques described herein is based on an Augmented Reality Monocle design, in which a user uses a device to look at nearby, real-time items (or to look at some other time or place through imagery, such as ground-level or aerial images), and in which the object that the user is looking at becomes the center of focus. In such an example, looking at a particular object might cause entities that have proximity relationships to the object and to the user to be displayed.

It is also noted that FIGS. 1, 2, and 4 show examples in which proximity relationships are assigned to discrete levels. However, the subject matter herein also includes the situation in which the user interface can depict proximity relationships of arbitrary strength without assigning those relationships to discrete levels.

Figure 5:
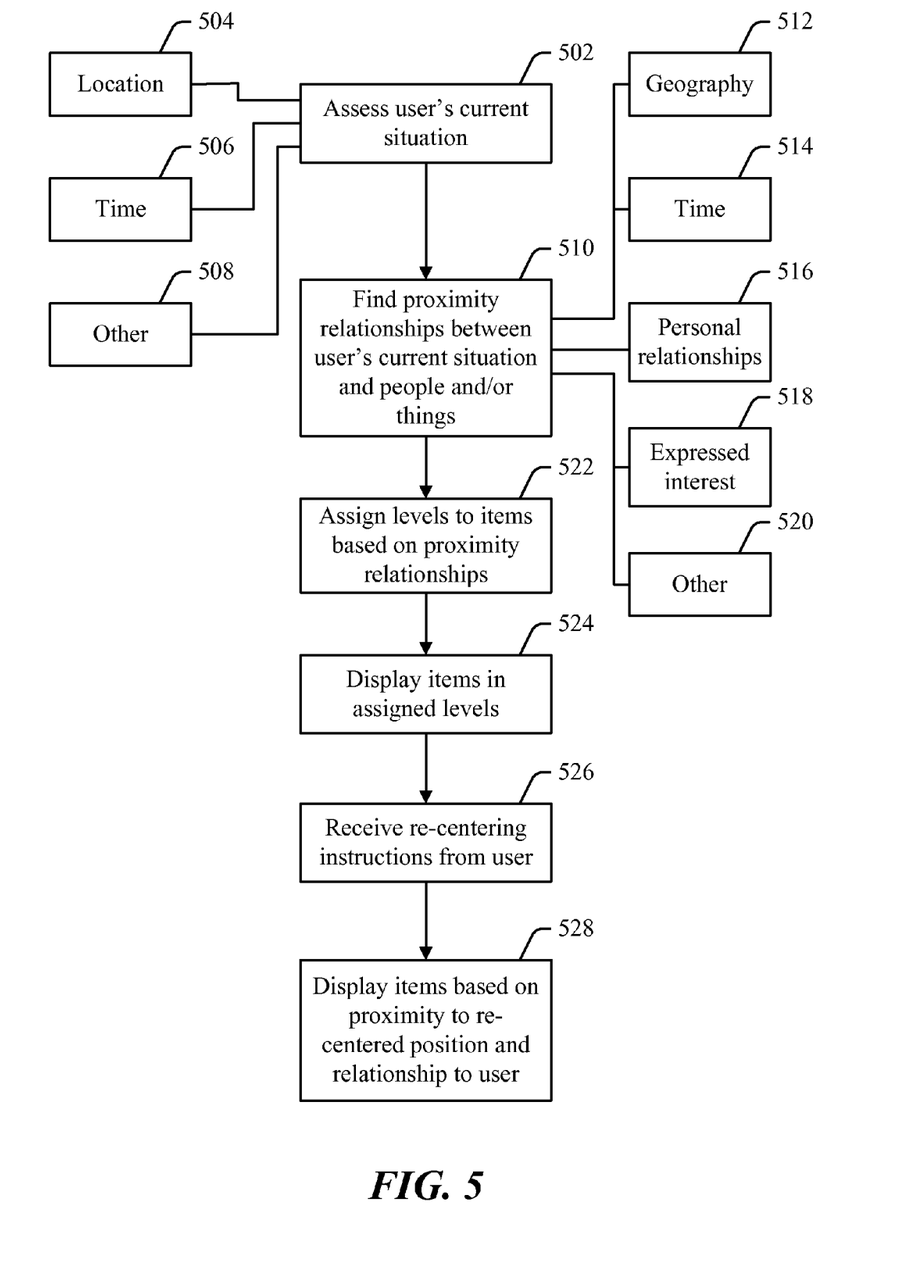
FIG. 5 is a block diagram of an example process in which information may be presented to a user.

FIG. 5 shows an example process in which information may be presented to a user in a way that reflects situational awareness. Before turning to a description of FIG. 5, it is noted that the flow diagram of FIG. 5 is described, by way of example, with reference to components shown in FIGS. 1-4, although the process of FIG. 5 may be carried out in any system and is not limited to the scenarios shown in FIGS. 1-4. Additionally, the flow diagram in FIG. 5 shows an example in which stages of a process are carried out in a particular order, as indicated by the lines connecting the blocks, but the various stages shown in these diagrams can be performed in any order, or in any combination or sub-combination.

At 502, the user's current situation is assessed. The assessment of the user's current situation may take into account the user's location (block 504), the current time (block 506), or any other appropriate factors (block 508). (As noted above, the use of information such as the user's current location may be made pursuant to appropriate permission obtained from the user, in order to protect the user's interest in privacy.)

At 510, proximity relationships may be found between the user's current situation and people and/or things. These proximity relationships may be based on geography (block 512), time (block 514), existing personal relationships (block 516), expressed interests (block 518), or any other types of relationships (block 520). In one example, a graph such as that shown in FIG. 3 may be used as a basis to find proximity relationships. That is, existing relationships between people and or things may be expressed in the graph in the form of labeled edges, and an algorithm may be used to assess the proximity of the user's current situation to the items represented in the graph. For example, given any node in the graph, a number representing the proximity of that node to the user may be assigned based on the type of relationship (geographic, temporal, etc.), the strength-value of the relationship, and the number of edges that have to be traversed to reach the user's current situation in the graph. The assigned number may represent the magnitude of proximity of any node in the graph to the user's current situation.

Once the proximities between the user and the various items in the graph are assessed, levels may be assigned to those items (at 522). The assignment of levels effectively represents a quantization of the assigned proximities. E.g., if two items have proximity values of 1.4 and 1.6, respectively, these values are numerically different from each other, but they may be collapsed into a single level. The assignment to levels may assist in simplifying the visual display of how items relate to the current situation, since the user interface (e.g., that depicted in FIG. 1 or in FIG. 4) may be designed around the idea of levels of proximity, rather than allowing for continuous, arbitrary proximities. Items are then displayed in their assigned levels (at 524). (It is noted, however, that the subject matter described herein does encompass the situation in which proximities are not assigned to discrete levels.)

At some point in time after the items are displayed, a re-centering instruction may be received from a user (at 526). For example, the user may tap on (or otherwise indicate) one of the items displayed. The way in which to display the various items in the graph may then be recalculated by evaluating the proximity between the various items in the graph and the indicated item. For example, if the user taps on a particular meeting that is displayed, the system may then calculate proximities to that meeting, and may adjust what is being displayed based on how proximate the items in the graph are to that meeting (at 528). However, the system may still use the user as a filter for what is shown. That is, rather than showing all information that is proximate to the selected meeting, the system might show, from among all the information that is proximate to the meeting, that subset of the information that also has some existing relationship with the user.

Figure 6:
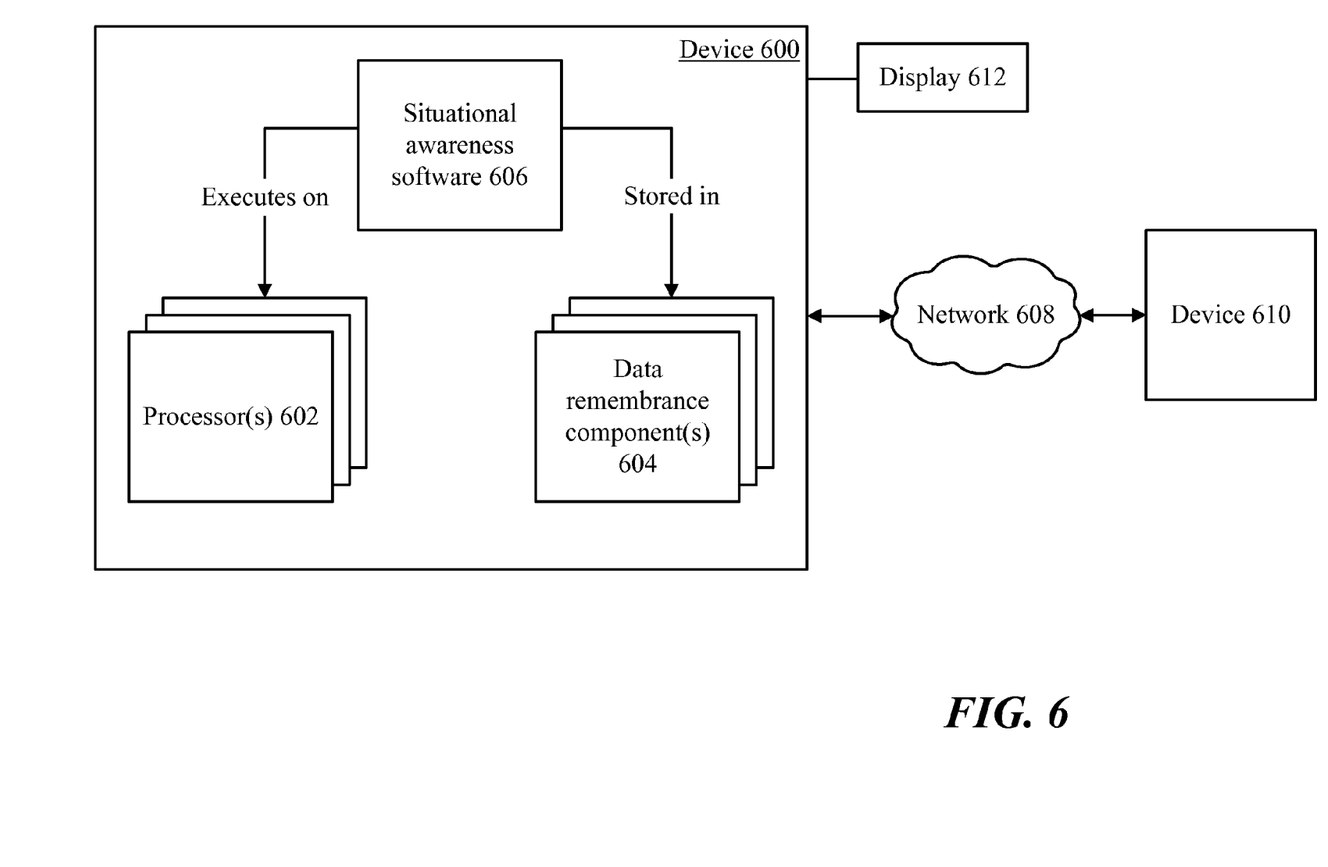
FIG. 6 is a block diagram of example components that may be used in connection with implementations of the subject matter described herein.

FIG. 6 shows an example environment in which aspects of the subject matter described herein may be deployed.

Device 600 includes one or more processors 602 and one or more data remembrance components 604. Device 600 may be any type of device with some computing power. A smart phone is one example of device 600, although device 600 could be a desktop computer, laptop computer, tablet computer, set top box, or any other appropriate type of device. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable (or device-readable) storage media. Device 600 may comprise, or be associated with, display 612, which may be a cathode ray tube (CRT) monitor, a liquid crystal display (LCD) monitor, or any other type of monitor. Display 612 may be an output-only type of display; however, in another non-limiting example, display 612 may be (or comprise) a touch screen that is capable of both displaying and receiving information.

Software may be stored in the data remembrance component(s) 604, and may execute on the one or more processor(s) 602. An example of such software is situational awareness software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A device (e.g., smart phone, personal computer, server computer, handheld computer, tablet computer, set top box, etc.) in which a program is stored on hard disk, loaded into RAM, and executed on the device's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more device-readable media. Such instructions, when executed by a phone, computer, or other machine, may cause the phone, computer, or other machine to perform one or more acts of a method. The instructions to perform the acts could be stored on one medium, or could be spread out across plural media, so that the instructions might appear collectively on the one or more computer-readable (or device-readable) media, regardless of whether all of the instructions happen to be on the same medium. The terms "computer-readable media" and "device-readable media" do not include information that exists solely as a propagating signal or solely as a signal per se. Additionally, it is noted that "hardware media" or "tangible media" include devices such as RAMs, ROMs, flash memories, and disks that exist in physical, tangible form; such "hardware media" or "tangible media" are not signals per se. Moreover, "storage media" are media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored."

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, device 600 may be communicatively connected to one or more other devices through network 608. Device 610, which may be similar in structure to any of the examples of device 600, is a kind of device that can be connected to device 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device-readable medium that stores executable instructions for providing information to a user, the executable instructions, when executed by a computer, causing the computer to perform acts comprising:
   assessing initial proximity levels of items to a current situation of said user based on a graph comprising: nodes representative of said items and said user, and edges between nodes indicative of relationships between and among said items and said current situation of said user, wherein said assessing comprises weighting: (1) a geographic proximity (physical nearness as indicated by the edges of the graph), (2) a temporal proximity (closeness in time as indicated by the edges of the graph), and (3) a relevance proximity (user interest as indicated by the edges of the graph), differently from one another;
   generating, on a display, a representation of said user;
   generating, on said display, representations of said items such that all displayed representations of items having higher initial proximity levels are displayed physically closer to said displayed representation of said user than any displayed representations of items having lower initial proximity levels;
   receiving user input directed to a selected item from among said items;
   assessing updated proximity levels of said items, said updated proximity levels being indicative of both a proximity to said current situation of said user and a proximity to said selected item;
   generating, on said display, a representation of said selected item co-located with said representation of said user; and
   regenerating, on said display, said representations of said items such that all displayed representations of items having higher updated proximity levels are displayed physically closer to said displayed representation of said user than any displayed representations of items having lower updated proximity levels.

2. The device-readable medium of claim 1, wherein said generating said representation of said user comprises generating said representation of said user at a bottom of said display; and wherein further said generating said representations of said items comprises generating said representations of said items such that representations of items having a highest proximity level are displayed above and proximate to said displayed representation of said user, and representations of items having successively lower proximity levels are displayed above said representations of items having said highest proximity level and further from said displayed representation of said user.

3. The device-readable medium of claim 2, wherein said generating said representations of said items comprises generating said representations of said items such that representations of items having said highest proximity level are displayed within a first discrete horizontal band across a first region of said display and said representations of items having said successively lower proximity levels are displayed within additional discrete horizontal band across additional regions of said display with representations of items having a given proximity level being displayed only within a horizontal band corresponding to that given level.

4. The device-readable medium of claim 1, wherein said generating said representations of said items comprises generating said representations of said items such that said representations of said items having higher proximity levels are displayed utilizing at least one of: a larger text size, a larger icon, or a more detailed icon than said representations of said items having lower proximity levels.

5. The device-readable medium of claim 3, wherein said generating said representations of said items within discrete horizontal bands across additional regions of said display comprises generating, in response to user scrolling input in a horizontal direction, additional representations of additional items only within a selected discrete horizontal band to which said user scrolling input in said horizontal direction was directed.

6. The device-readable medium of claim 1, wherein said generating said representation of said user comprises generating said representation of said user at a center of said display; and wherein further said generating said representations of said items comprises generating said representations of said items such that representations of items having a highest proximity level are displayed proximate to and surrounding said displayed representation of said user, and representations of items having successively lower proximity levels are displayed radially further from, and still surrounding, said displayed representation of said user.

7. A method of providing information to a user, the method comprising:
   using a processor to perform acts comprising:
   assessing initial proximity levels of items to a current situation of said user based on a graph comprising: nodes representative of said items and said user, and edges between nodes indicative of relationships between and among said items and said current situation of said user, wherein said assessing comprises weighting: (1) a geographic proximity (physical nearness as indicated by the edges of the graph), (2) a temporal proximity (closeness in time as indicated by the edges of the graph), and (3) a relevance proximity (user interest as indicated by the edges of the graph), differently from one another;
   generating, on a display communicationally coupled to said processor, a representation of said user;
   generating, on said display, representations of said items such that all displayed representations of items having higher initial proximity levels are displayed physically closer to said displayed representation of said user than any displayed representations of items having lower initial proximity levels;
   receiving user input directed to a selected item from among said items; assessing updated proximity levels of said items, said updated proximity levels being indicative of both a proximity to said current situation of said user and a proximity to said selected item;
   generating, on said display, a representation of said selected item co-located with said representation of said user; and
   regenerating, on said display, said representations of said items such that all displayed representations of items having higher updated proximity levels are displayed physically closer to said displayed representation of said user than any displayed representations of items having lower updated proximity levels.

8. The method of claim 7, wherein said generating said representation of said user comprises generating said representation of said user at a bottom of said display; and wherein further said generating said representations of said items comprises generating said representations of said items such that representations of items having a highest proximity level are displayed above and proximate to said displayed representation of said user, and representations of items having successively lower proximity levels are displayed above said representations of items having said highest proximity level and further from said displayed representation of said user.

9. The method of claim 8, wherein said generating said representations of said items comprises generating said representations of said items such that said representations of items having said highest proximity level are displayed within a first discrete horizontal band across a first region of said display and said representations of items having said successively lower proximity levels are displayed within additional discrete horizontal band across additional regions of said display with representations of items having a given proximity level being displayed only within a horizontal band corresponding to that given level.

10. The method of claim 7, wherein said generating said representations of said items comprises generating said representations of said items such that said representations of said items having higher proximity levels are displayed utilizing at least one of: a larger text size, a larger icon, or a more detailed icon than said representations of said items having lower proximity levels.

11. The method of claim 9, wherein said generating said representations of said items within discrete horizontal bands across additional regions of said display comprises generating, in response to user scrolling input in a horizontal direction, additional representations of additional items only within a selected discrete horizontal band to which said user scrolling input in said horizontal direction was directed.

12. The method of claim 7, wherein said generating said representation of said user comprises generating said representation of said user at a center of said display; and wherein further said generating said representations of said items comprises generating said representations of said items such that representations of items having a highest proximity level are displayed proximate to and surrounding said displayed representation of said user, and representations of items having successively lower proximity levels are displayed radially further from, and still surrounding, said displayed representation of said user.

13. The method of claim 12, wherein said generating said representations of said items comprises generating said representations of said items such that said representations of items having said highest proximity level are displayed along a first circle and said representations of items having said successively lower proximity levels are displayed along additional circles concentric with each other and the first circle, such that representations of items having a given proximity level are displayed only along a concentric circle corresponding to that given level.

14. A device for providing information to a user, the device comprising:
   a memory;
   a processor;
   a display; and
   a component that is stored in said memory, that executes on said processor, and, when executed on said processor, causes said device to perform acts comprising:
   assessing initial proximity levels of said items to a current situation of said user based on a graph comprising: nodes representative of said items and said user, and edges between nodes indicative of relationships between and among said items and said current situation of said user, wherein said assessing comprises weighting: (1) a geographic proximity (physical nearness as indicated by the edges of the graph), (2) a temporal proximity, (closeness in time as indicated by the edges of the graph), and (3) a relevance proximity (user interest as indicated by the edges of the graph), differently from one another;
   generating, on said display, a representation of said user;
   generating, on said display, representations of said items such that all displayed representations of items having higher initial proximity levels are displayed physically closer to said displayed representation of said user than any displayed representations of items having lower initial proximity levels;
   receiving user input directed to a selected item from among said items; assessing updated proximity levels of said items, said updated proximity levels being indicative of both a proximity to said current situation of said user and a proximity to said selected item;
   generating, on said display, a representation of said selected item co-located with said representation of said user; and
   regenerating, on said display, said representations of said items such that all displayed representations of items having higher updated proximity levels are displayed physically closer to said displayed representation of said user than any displayed representations of items having lower updated proximity levels.

15. The device of claim 14, said display showing a representation of said user at a bottom of said display, with representations of items having a highest proximity level shown above and proximate to said displayed representation of said user, and representations of items having successively lower proximity levels shown above said representations of items having said highest proximity levels and further from said displayed representation of said user.

16. The device of claim 15, wherein said generating said representations of said items comprises generating said representations of said items such that said representations of items having said highest proximity level are displayed within a first discrete horizontal band across a first region of said display and said representations of items having said successively lower proximity levels are displayed within additional discrete horizontal band across additional regions of said display with representations of items having a given proximity level being displayed only within a horizontal band corresponding to that given level.

17. The device of claim 14, wherein said generating said representations of said items comprises generating said representations of said items such that said representations of said items having higher proximity levels are displayed utilizing at least one of: a larger text size, a larger icon, or a more detailed icon than said representations of said items having lower proximity levels.

18. The device of claim 16, wherein said generating said representations of said items within discrete horizontal bands across additional regions of said display comprises generating, in response to user scrolling input in a horizontal direction, additional representations of additional items only within a selected discrete horizontal band to which said user scrolling input in said horizontal direction was directed.

19. The device of claim 14, wherein said generating said representation of said user comprises generating said representation of said user at a center of said display; and wherein further said generating said representations of said items comprises generating said representations of said items such that representations of items having a highest proximity level are displayed proximate to and surrounding said displayed representation of said user, and representations of items having successively lower proximity levels are displayed radially further from, and still surrounding, said displayed representation of said user.

20. The device of claim 19, wherein said generating said representations of said items comprises generating said representations of said items such that said representations of items having said highest proximity level are displayed along a first circle and said representations of items having said successively lower proximity levels are displayed along additional circles concentric with each other and the first circle, such that representations of items having a given proximity level are displayed only along a concentric circle corresponding to that given level.

\* \* \* \* \*